FIG. 1

INVENTOR.
RUDOLF F. WILD

April 29, 1952          R. F. WILD          2,595,034
ANTIHUNTING MEASURING AND CONTROLLING APPARATUS
Filed Nov. 3, 1949          4 Sheets-Sheet 2

INVENTOR.
RUDOLF F. WILD
BY Arthur H. Swanson
ATTORNEY.

April 29, 1952 R. F. WILD 2,595,034
ANTIHUNTING MEASURING AND CONTROLLING APPARATUS
Filed Nov. 3, 1949 4 Sheets-Sheet 3

*INVENTOR.*
RUDOLF F. WILD
BY Arthur H. Swenson
ATTORNEY.

April 29, 1952

R. F. WILD 2,595,034

ANTIHUNTING MEASURING AND CONTROLLING APPARATUS

Filed Nov. 3, 1949

INVENTOR.
RUDOLF F. WILD
BY
Arthur H. Swanson
ATTORNEY.

Patented Apr. 29, 1952

2,595,034

UNITED STATES PATENT OFFICE 2,595,034

ANTIHUNTING MEASURING AND CONTROLLING APPARATUS

Rudolf F. Wild, Wilmington, Del., assignor to Minneapolis-Honeywell Regulator Company, Minneapolis, Minn., a corporation of Delaware Application November 3, 1949, Serial No. 125,199

13 Claims. (Cl. 318—28)

1

The general object of the present invention is to provide motor damping means for measuring and controlling apparatus including a motor and motor control means for automatically effecting a rebalancing or follow up adjustment of a measuring circuit on variations in the value of the quantity measured by said circuit. The invention was devised primarily for use with measuring apparatus including a voltage amplifier and motor drive mechanism of the widely used type disclosed and claimed in the Wills patent, 2,423,540 of July 8, 1947. The control signal amplified in said voltage amplifier is an alternating current signal of relatively low frequency. That frequency is usually 60 cycles per second, and, as of a matter of convenience, the signal frequency used in all forms of the invention will be hereinafter assumed to be 60 cycles per second, though that particular signal frequency is not an essential feature of the present invention.

The operation of the motor drive mechanism disclosed in the above mentioned patent is characterized by the variations in the components of the current flowing through the control winding of the reversible two phase rebalancing motor included in said mechanism. Thus, when a rebalancing operation of the motor ceases as a result of the attainment of balance, the current flowing through the control winding includes a relatively large direct current component and a relatively large alternating current component having a frequency of 120 cycles per second, which is double the frequency of the alternating motor control signal. In that condition of operation, the control winding current includes substantially no 60 cycle component. When the measuring apparatus is unbalanced to a substantial extent and the rebalancing motor is operating at full speed, the motor control winding current includes a relatively large 60 cycle alternating current component, a direct current component which is comparatively small and substantially no 120 cycle component. As balance is being approached and the speed of the rebalancing motor is progressively reduced, the 60 cycle component of the control winding current progressively diminishes and fades away and a 120 cycle component develops and progressively increases, and the direct current component progressively increases through a range of operating conditions.

A primary object of the present invention is to provide simple and effective means for using the 60 cycle component, and not the 120 cycle component, of the control winding current in de-

2 veloping a damping voltage which is fed back into the amplifier in some forms of the invention, and which in other forms of the invention is fed back into the measuring circuit in which variations in the voltage measured produce the signal which is amplified. When the voltage measured is a unidirectional voltage converted into an alternating voltage before amplification, and the damping signal is injected into the measuring circuit, means are included in the feed back connection for rectifying the damping signal.

Specific objects of the present invention are to provide suitable practical arrangements for separating the 120 cycle component of the control winding current from the 60 cycle component used in the production of the damping signal, or alternative arrangements for neutralizing the tendency of the 120 cycle current component to interfere with, or prevent the development of, the desired damping component.

The various features of novelty which characterize my invention are pointed out with particularity in the claims annexed to and forming a part of this specification. For a better understanding of the invention, however, its advantages, and specific objects attained with its use, reference should be had to the accompanying drawing and descriptive matter in which I have illustrated and described preferred embodiments of the invention.

Figure 1:
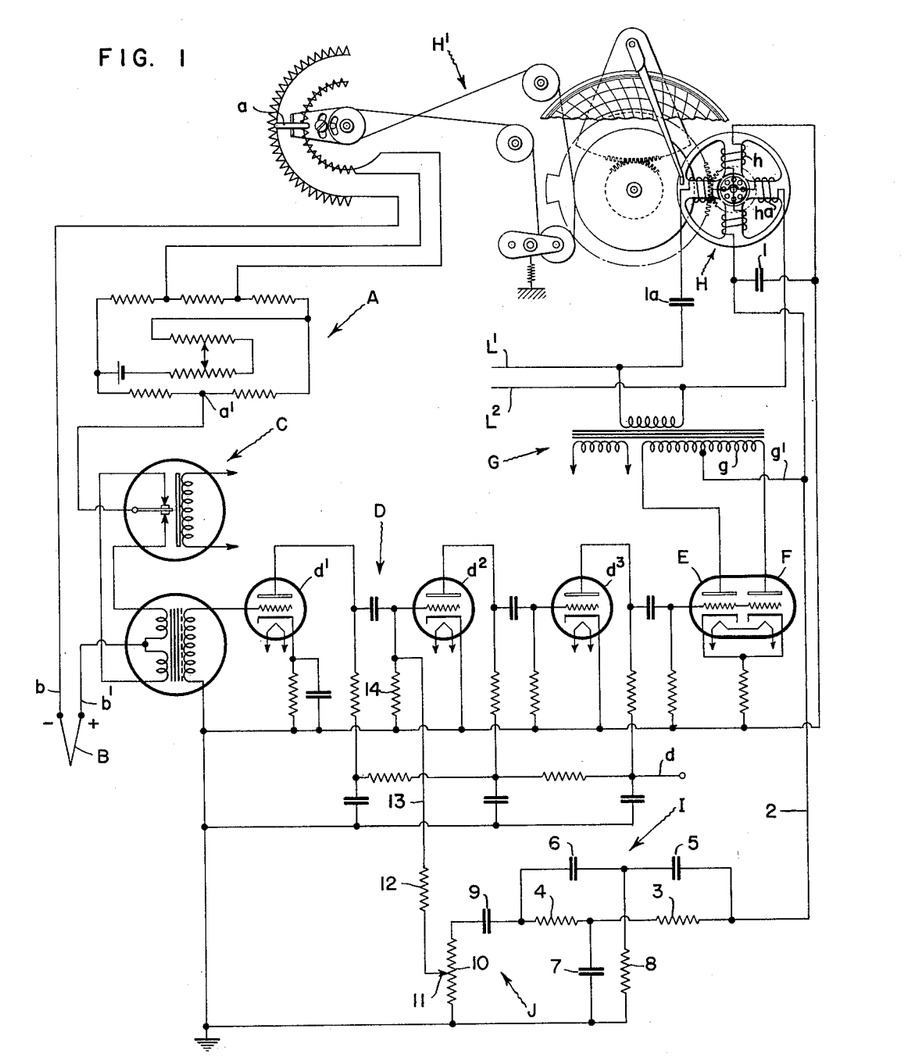
Fig. 1 is a diagram illustrating conventional measuring apparatus including an amplifier and provided with means for injecting a low frequency alternating current damping signal into an input portion of said amplifier.

In Fig. 1, I have illustrated the use of a desirable form of the present invention in controlling the rebalancing motor of a self- balancing potentiometric measuring apparatus, including elements A, B, C, D, E, F, G, H, and H', which is of the well known type disclosed in the Wills Patent 2,423,540 of July 8, 1947. In accordance with the present invention, a frequency filter or screening device I and a compensating phase shifting device J are included in a feed back circuit connected between the control grid of a valve $d^2$, included in the multistage amplifier element D of the measuring apparatus, and the center tap $g'$ connected to the ungrounded terminal of the control winding $h$ of the rebalancing motor element H. The purpose of the feed back circuit is to inject a damping signal of appropriate frequency, magnitude and phase into the amplifier D which will oppose and neutralize more or less of the effect otherwise produced by the control signal impressed on the amplifier D by the converter element C.

The measuring apparatus shown in Fig. 1 comprises a measuring bridge circuit A having a slider contact $a$ connected to the terminal $b$ of a thermocouple B which has its second terminal $b'$, connected through a conversion mechanism or converter C to the bridge circuit A, at a fixed point $a'$ thereof. The point $a'$ is so located that when the slider contact $a$ is adjusted along the associated bridge slide wire into the position in which the bridge is balanced, the voltage drop between the points $a$ and $a'$ will be equal in magnitude to the thermocouple voltage, and in bucking relation therewith.

The slider contact $a$ is adjustable in position by the cable mechanism H' which, as shown, is operated by the rebalancing motor H. When the bridge is unbalanced, a unidirectional current flows through the conversion apparatus C between the point $a'$ and the positive terminal $b'$ of the thermocouple B in one direction, or in the opposite direction, depending on the direction of bridge circuit unbalance. The apparatus C converts the unidirectional current flowing between the thermocouple and the point $a'$ into an alternating current signal which is impressed on the input circuit of the electronic multistage voltage amplifier D. The latter includes first, second and third stage amplifying triode valves $d'$, $d^2$ and $d^3$. As diagrammatically shown, the cathodes of said valves are each connected to ground, and the anodes of the valves are connected to a conductor $d$ supplying unidirectional anode current to the valves $d'$, $d^2$ and $d^3$.

The output circuit of the voltage amplifier D is connected to, and impresses a control signal on, the control grids of the motor drive valves E and F. The anodes of the valves E and F are connected to the end terminals of the secondary winding $g$ of a transformer G. The latter has its primary winding connected to conductors L' and $L^2$, supplying alternating current of a suitable frequency and voltage, which usually are and are assumed to be 60 cycles per second and 110–115 volts. The secondary winding $g$ has a center tap $g'$ connecting the midpoint of the winding $g$ to the ungrounded terminal of a winding $h$. The latter is the control winding of the reversible two phase rebalancing motor H. The second terminal of the winding $h$ is connected to ground. A tuning condenser $l$ is connected in parallel with the control winding $h$. The power winding $ha$ of the motor H is connected to the branches of the alternating supply conductors L' and $L^2$ in series with a tuning condenser $la$.

As is well known, and is clearly pointed out in said prior Wills patent, the character of the current flowing through the motor control winding of amplifying and motor drive apparatus of the type shown in Fig. 1 varies with the conditions of operation. Thus when the measuring circuit is balanced, the current flowing through the control winding includes no 60 cycle component, but does include a 120 cycle component during each half of each cycle of alternation, and includes a substantial direct current component during each half of each supply voltage cycle. When the measuring circuit is slightly unbalanced, the 120 cycle component appears during one-half, and a relatively small 60 cycle component appears during the other half, of each cycle, and a direct current component appears during each half of each cycle. When the unbalance of the measuring circuit is substantial, the current passing through the motor control winding includes no 120 cycle component, but includes a relatively large 60 cycle component during each half of each supply voltage cycle, and includes a small direct current component at all times. The direct current component is smaller, when the unbalance is substantial, then when the unbalance is slight, and increases as balance is approached.

The direct and 120 cycle components of current flowing through the motor control winding when the measuring circuit is balanced, or is only partially unbalanced, have no motor driving tendency, but do subject the motor to a damping action. That action is not effective, however, to bring the motor to rest in its balancing position as promptly as is desirable in many uses of the apparatus. In Fig. 1, a feed back, damping circuit including the frequency filter device I and phase shifter J is provided to supply the additional damping action needed. The feed back, damping circuit including the frequency filter I and the phase shifter device J includes a terminal conductor 2 directly connected to the center tap conductor $g'$ and thereby to the motor control winding $h$. The feed back damping circuit has a second terminal conductor 13 connected to the control grid of the amplifier valve $d^2$.

The device I comprises resistors 3 and 4 connected in series between the conductor 2 and a condenser 9, series connected condensers 5 and 6 connected in parallel with the series connected resistors 3 and 4, a ground connecting condenser 7, and a resistor 8. The conductor 2 is connected to the connected terminals of the resistor 3 and condenser 5. The condenser 7 connects the connected terminals of resistors 3 and 4 to ground, and the resistor 8 connects the connected terminals of the condensers 5 and 6 to ground. The condenser 9 is connected in series with a resistor 10 between the device I and ground, and the condenser 9 and resistor 10 collectively form the phase shifter J. As shown, the resistor 10 serves as a potentiometer slide wire resistor engaged by a slider contact 11. The latter is connected through a resistor 12 and conductor 13 to the control grid of the valve $d^2$. That grid also is connected to ground through a grid resistor 14.

When a current including 60 cycle and 120 cycle components passes from the conductor $g'$ to the device I, the latter separates the two components and passes the 120 cycle components to ground through the elements 7 and 8. The 60 cycle component passes from the device I to the phase shifter device J. The latter is employed to shift the phase of the current passing in series through the devices I and J as required to neutralize or compensate for the inherent phase shifting action of the device I. In consequence of the reverse phase shifting action of the device J, the damping current passing from the device J to the amplifier valve $d^2$ is in phase with the current passing to the device I from the ungrounded terminal of the motor drive winding $h$.

The phase shifting characteristics of the devices I and J are well known. The device I is of the type commonly known as a "parallel-T, resistance-capacitance, frequency-selective network," and as a "parallel-T, RC network." The frequency selecting and phase shifting actions of such a network are described in some detail in the article of Leonard Stanton published in July 1946, in the I. R. E. Proceedings, vol. 34, No. 7. In practice, the magnitude of the phase shift produced by the device I depends upon the design of said device, and may well be a phase lag of about 60°. A phase shift in the reverse direction, i. e., a phase lead of 60°, is readily obtainable with the phase shifting element J when its condenser 9 and resistor 10, respectively, have suitable capacity and resistance values. Note, for example, pages 505 and 506 of Terman's "Radio Engineers' Handbook," 1943 edition.

In the rebalancing operation of the apparatus shown in Fig. 1, the damping signal transmitted through the conductor 13 to the control grid of the valve $d^2$ is opposite in phase to the control signal transmitted to said control grid from the output circuit of the valve $d'$. This results from the well known fact that in the operation of an alternating current electronic amplifier, the input and output voltages of each tube stage are 180° out of phase. In consequence, with the three stage amplifier D impressing a control signal on the control grids of the valves E and F, the phase of the damping signal current passing from the center tap conductor $g'$ through the devices I and J and conductor 13 to the control grid of the amplifier valve $d^2$ will be 180° out of phase with the control signal transmitted from the anode of the first stage amplifier valve $d'$ to the control grid of the second stage amplifier valve $d^2$. Since the damping signal transmitted through the conductor 13 to the control grid of the valve $d^2$ is opposite in phase to the signal transmitted to said control grid from the anode of the valve $d'$, the control signal actually impressed on the control grid of the valve $d^2$ is the resultant of the two signals of opposed phase separately transmitted to the control grid. The effect of the damping signal transmitted to the valve $d^2$ has the same effect on the output current of the valve $d^2$ as would a reduction in, or reversal in the direction of, the existing unbalance in the thermocouple circuit. In consequence, the damping signal transmitted to the control grid of the valve $d^2$, when the motor H begins to slow down as a result of a reduction in the unbalance of the thermocouple circuit, provides true anticipatory control since it results in a sudden reduction in the rotative speed of the motor H, and may even reverse the direction of motor rotation.

Figures 2, 8:
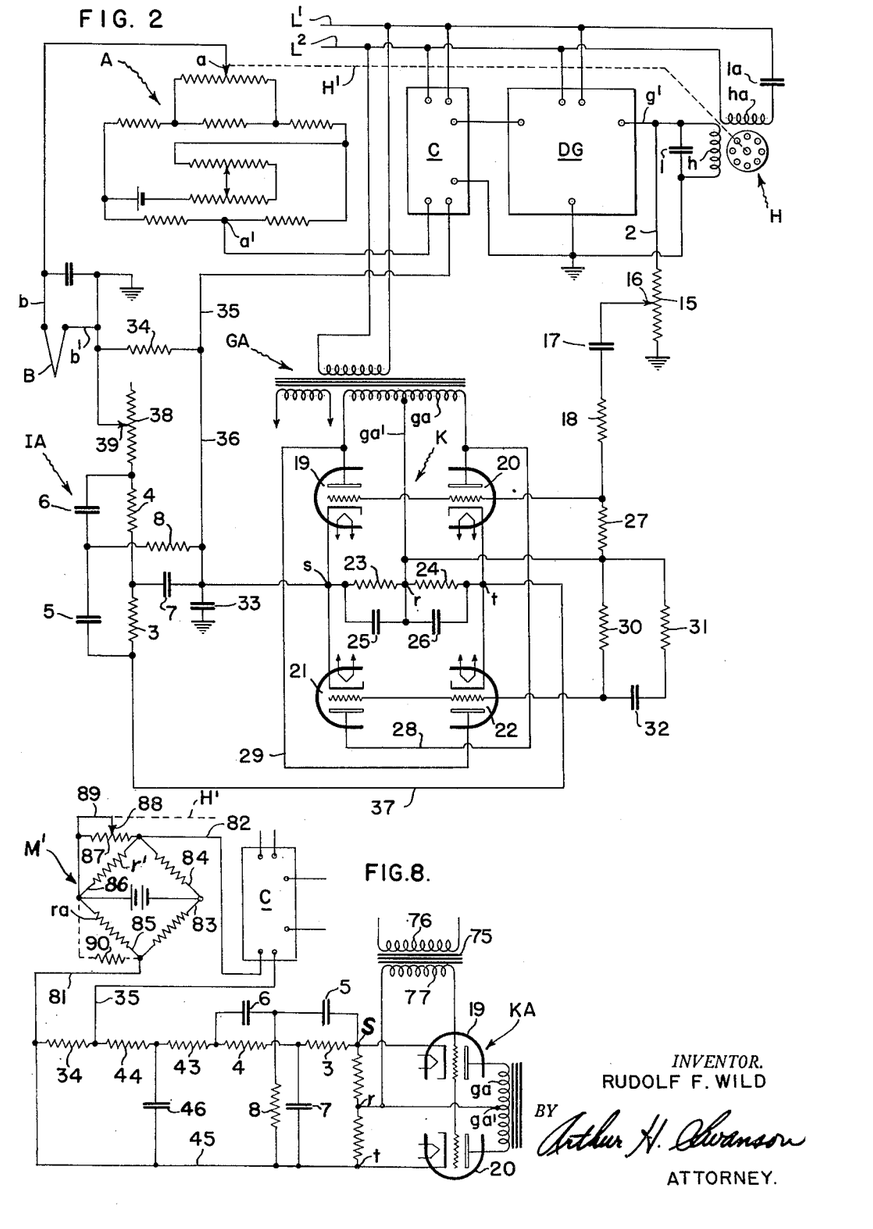
Fig. 2 is a diagram illustrating means for rectifying a 60 cycle current and for injecting the rectified current into the direct current measuring circuit of conventional measuring apparatus of the type shown in Fig. 1.
Fig. 8 is a diagram illustrating a modification of the arrangement of Fig. 5 or Fig. 6 in combination with apparatus of the type shown in Fig. 3.
Figures 3, 4, 7:
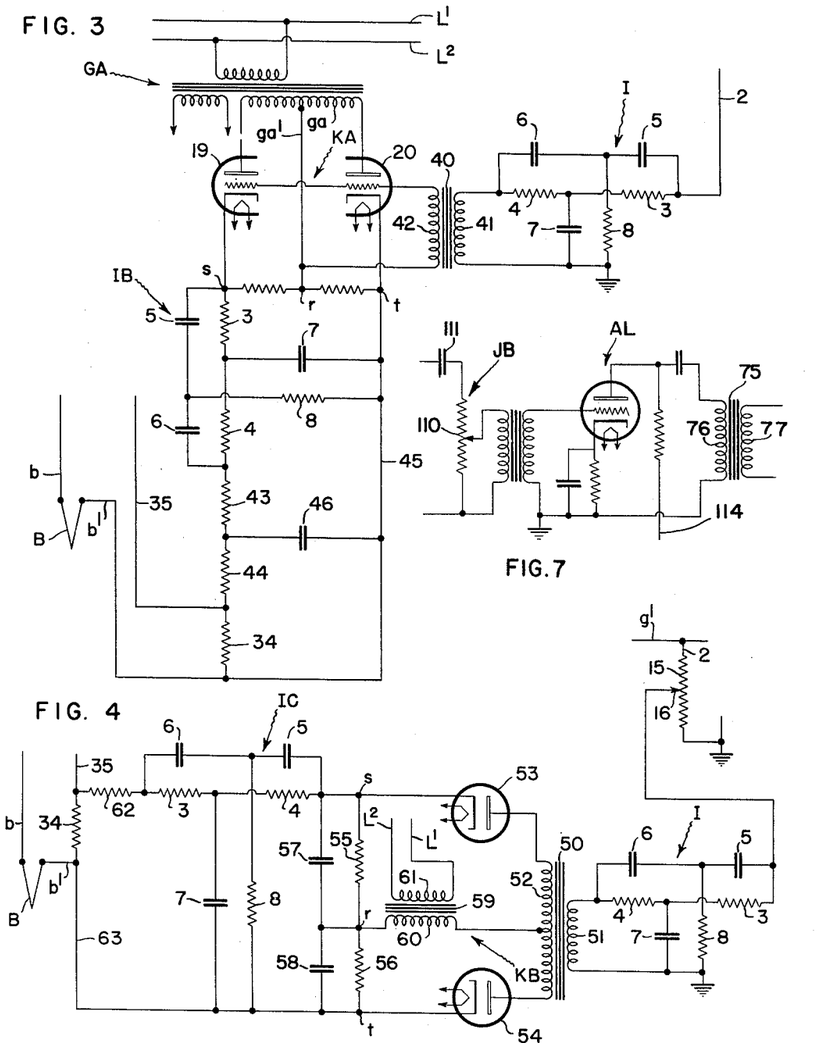
Figs. 3 and 4 illustrate different modifications of the apparatus shown in Fig. 2.
Fig. 7 is a diagram illustrating a modification of the arrangement of Fig. 6.

While in the form of the invention shown in Fig. 1 an alternating current damping voltage is fed back into the amplifier D, other forms of the invention include means for producing a unidirectional damping voltage and feeding it back into the unidirectional current measuring circuit of apparatus of the general character shown in Fig. 1. One such arrangement is illustrated in Fig. 2, and other arrangements of the same general type are illustrated in Figs. 3 and 4. Except in respect to its damping provisions, the apparatus shown diagrammatically in Fig. 2 may be identical with that shown in Fig. 1. In Fig. 2, C represents a converter similar to that shown in Fig. 1, and the block diagram element DG represents voltage amplifier, motor drive and transformer elements which may be identical with the elements D, E, F and G of Fig. 1.

In Fig. 2, the center tap conductor $g'$, connecting the motor control winding $h$ to a transformer secondary winding in the element DG as in Fig. 1, is connected to ground through the conductor 2 and a potentiometer resistor 15 engaged by a slider contact 16. The contact 16 is connected through a coupling condenser 17 and an isolation resistor 18 to the control grids of triode valves 19 and 20 of a phase sensitive rectifier K of the type disclosed and claimed in my application Serial No. 101,974, filed June 29, 1949, and now Patent No. 2,572,794 of October 23, 1951.

A characteristic feature of that rectifier is its use of electronic valves to eliminate or reduce ripple in the voltage output of the rectifier. Thus in Fig. 2, a pair of ripple eliminating valves 21 and 22 is associated with the main rectifier valves 19 and 20. The valves 19, 20, 21 and 22 are similar valves, each having a control grid, and, in practice, each may well be one-half of the commercially available 7N7 type. The rectifier K is energized by a transformer GA having its primary winding connected to conductors L' and L² supplying alternating current of suitable frequency and voltage, assumed to be 60 cycles per second and 110–115 volts. The secondary winding $ga$ of the transformer GA has one end terminal connected to the anode of the valve 19 and has its other end terminal connected to the anode of the valve 20. The winding $ga$ has a center tap terminal $ga'$ connected at the point $r$ to the connected terminals of cathode resistors 23 and 24. The second terminal of the cathode resistor 23 is connected to the cathodes of the valves 19 and 21 at the point $s$, and the second terminal of the cathode resistor 24 is connected to the cathodes of the valves 20 and 22 at the point $t$. The cathode resistors 23 and 24 are shunted by condensers 25 and 26 respectively. The control grids of the valves 19 and 20 are connected to the center tap terminal $ga'$ by the resistor 27.

The cathodes of the valves 21 and 22 are directly connected to the cathodes of the valves 19 and 20, respectively. The anode of the valve 21 is connected to the anode of the valve 20 by a conductor 28, and the anode of the valve 22 is connected to the anode of the valve 19 by the conductor 29. The control grids of the valves 21 and 22 are connected by a resistor 30 to the terminal of the resistor 27 which is connected to the center tap terminal $ga'$. The control grids of the valves 21 and 22 are thus connected to the center tap terminal $ga'$, and thereby to the connected ends of the cathode resistors 23 and 24. The terminals of the resistor 30 are connected by a shunt including in series a resistor 31 and a condenser 32. The point $s$ of the phase sensitive rectifier K is connected to ground by a condenser 33. The condensers 33 and 17 isolate the rectifier K from ground and thus make it possible to ground the thermocouple B, as is desirable in many cases.

In Fig. 2, the terminal $b'$ of the thermocouple B is connected to the converter C through a resistor 34 and conductor 35, and the rectified current output points $s$ and $t$ of the phase sensitive rectifier K are connected across the resistor 34. As shown, the point s is connected by a conductor 36 to the terminal of the resistor 34 connected to the conductor 35, and the point t is connected to the second terminal of the resistor 34 by a circuit including a conductor 37, a parallel-T, RC, frequency-selective network IA, and a potentiometer resistor 38. The resistor 38 is engaged by a slider contact 39 which is connected to the junction of the thermocouple terminal b' and the resistor 34. As shown, the network IA is a replica of the network I of Fig. 1, except that in Fig. 2 the condenser 7 directly connects the resistors 3 and 4 to the conductor 36, and the resistor 8 directly connects the condensers 5 and 6 to said conductor 36.

In the operation of the apparatus shown in Fig. 2, both the 60 cycle and the 120 cycle motor voltage components appearing in the control winding circuit are applied to the rectifier K. However, since that rectifier is phase sensitive and is energized with 60 cycle current, the 120 cycle component is not rectified by the rectifier K and does not add to the direct current signal developed between the points s and t. The valves 21 and 22 provide the effective filtering needed to substantially eliminate ripple voltage from the rectifier output circuit formed by the cathode resistors 23 and 24. Further filtering of the rectifier output to eliminate any 60 cycle component is effected by the network IA.

No unidirectional voltage is developed in the cathode resistors 23 and 24 when the measuring bridge is balanced. When the bridge is unbalanced, the signal developed between the points s and t will be that required for the injection of a damping voltage signal into the portion of the thermocouple circuit formed by the resistor 34 which is of the polarity required to oppose the existing thermocouple current. The resistors 30 and 31 and condenser 32 serve the purpose of compensating for a ripple voltage tendency inherent in the operation of the rectifier K under certain conditions which need not be discussed herein, as the compensating provisions referred to are fully described and claimed in the above mentioned prior application.

In the arrangement shown in Fig. 2, as in that shown in Fig. 1, the voltage fed back to the motor control apparatus increases as the motor speed increases and may consequently produce an undesirably large reduction in the maximum motor speed. Thus, it may be desirable, in some cases, to limit the magnitude of the damping signal fed back, and Fig. 3 illustrates a modification of the apparatus shown in Fig. 2 which is adapted to prevent the feed back signal from increasing above a predetermined amount.

In Fig. 3, a parallel-T RC, network I, which may be identical with the network I of Fig. 1, is connected by conductor 2 as in Fig. 1. The network I of Fig. 3 is tuned to attenuate 120 cycle current, and in conjunction with an inductive coupling 40 and the conductor 2 connects the center tap conductor g' and the ungrounded end of the motor winding h (not shown in Fig. 3) to a phase sensitive rectifier KA. The rectifier KA is designed and proportioned to become saturated for applied motor voltages exceeding a predetermined value. In consequence, it permits the feed back signal to increase only up to the value attained when the motor reaches the speed at which the rectifier becomes saturated.

The rectifier KA differs from the rectifier K operatively as hereinafter explained, and while it may be structurally like the rectifier K, as shown, the rectifier KA differs structurally from the rectifier K in that it replaces the ripple voltage eliminating triodes 21 and 22 of Fig. 2 by a parallel-T, RC, network IB. The network IB differs from the network IA in the manner in which it is connected between the rectifier and the thermocouple circuit, but is like the network IA in that it is tuned to attenuate the small portion of the 60 cycle component of the signal transmitted through the associated network I to the rectifier KA, and not rectified by the latter. The inductive coupling 40 comprises a primary coil 41 connected between ground and the end of the network I remote from the conductor 2, and comprises a secondary coil 42 having one terminal connected to the control grids of the rectifier valves 19 and 20 and having its other terminal connected to the center tap conductor ga'.

In Fig. 3, network IB has one end terminal connected directly to the rectifier point s and has its other end terminal connected through series connected resistors 43 and 44 to one terminal of a resistor 34 which is included in the thermocouple circuit of Fig. 3 as in Fig. 2. The second terminal of the resistor 34 of Fig. 3 is connected through a conductor 45 to the rectifier point t. The condenser 7 connects the series connected resistors 3 and 4 of the network IB to the conductor 45, and the resistor 8 connects the series connected condensers 5 and 6 of the network IB to the conductor 45. The connected ends of the resistors 43 and 44 are connected through a condenser 46 to the conductor 45.

The general operation of the apparatus shown in Fig. 3 will be apparent from the foregoing description. While the apparatus shown in Fig. 3 is somewhat simpler than that shown in Fig. 2, and the rectifier KA is not as efficient as the rectifier K from the ripple elimination standpoint, the Fig. 3 apparatus is capable of satisfactory operation. It has an advantage over the apparatus shown in Fig. 1, as well as over that shown in Fig. 2, in that it definitely limits the magnitude of the damping signal feed back, and thus permits higher average motor speed, and a more speedy rebalancing action, than are obtainable with the apparatus shown in Figs. 1 and 2, in each of which a large portion of the original signal is neutralized by the feed back signal.

Fig. 4 illustrates apparatus generally similar in its structural and operative characteristics to the apparatus shown in Fig. 3. The Fig. 4 apparatus differs somewhat from that shown in Fig. 3, however, in the character of its phase sensitive rectifier KB. The conductor 2 and a potentiometer resistors 15 connect the amplifier output center tap conductor g' to ground in Fig. 4 as in Fig. 2. The slider contact 16 engaging the resistor 15 of Fig. 4 is connected to one end terminal of a parallel-T, RC, network I. The latter has its second terminal connected to ground through the primary winding 51 of a coupling transformer 50. The secondary winding 52 of the transformer 50 has one end terminal connected to the anode of a valve 53, and has its second end terminal connected to the anode of a second valve 54. The rectifying valves 53 and 54 of the phase sensitive rectifier KB are diodes. The cathodes of the valves 53 and 54 are connected by series connected resistors 55 and 56 extending between the rectifier points s and t. The resistors 55 and 56 are shunted by condensers 57 and 58 respectively.

Energizing current is supplied to the rectifier KB through a transformer 59. The secondary winding 60 of the transformer has one end terminal connected to the connected ends of the resistors 55 and 56 at the point r. The other end terminal of the winding 60 is connected to the coupling transformer secondary winding 52 through a center tap connection to the latter. The primary winding 61 of the transformer 59 is connected across alternating current supply conductors L' and L², assumed to supply 60 cycle current at 110–115 volts. A parallel-T, RC, network IC, tuned to attenuate 60 cycle current, has one end terminal connected to the rectifier KB at the point s, and has its other end terminal connected through a resistor 62 to one terminal of a resistor 34 in the thermocouple circuit, said resistor 34 being connected through the conductor 35 to a converter (not shown), as in Figs. 2 and 3. The second terminal of the resistor 34 is connected to the thermocouple terminal b', and is also connected by a conductor 63 to the rectifier KB at the point t. The condenser element 7 and resistor element 8 of the network IC respectively connect the network resistors 3 and 4 and condensers 5 and 6 to the conductor 63.

With the arrangement shown in Fig. 4, a unidirectional voltage of a polarity depending on the existing phase of the rebalancing motor voltage is developed between the rectifier points s and t, and an appropriate portion thereof is supplied to the thermocouple and measuring circuits in substantially the same manner in which unidirectional voltage is supplied to the corresponding circuits of Fig. 3.

Figure 5:
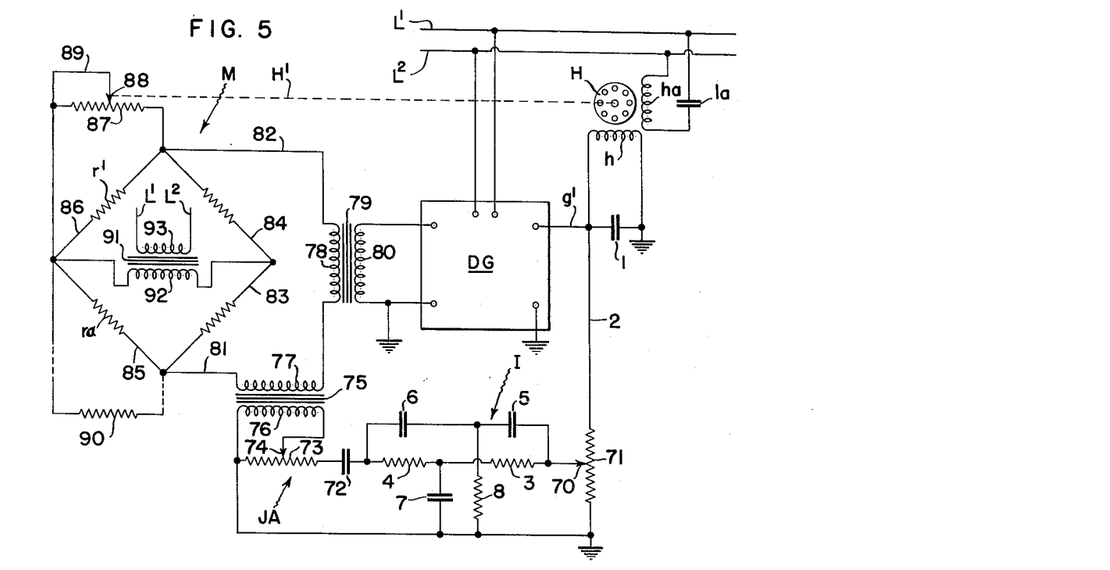
Figs. 5 and 6 are diagrams illustrating alternative arrangements for developing an alternating current damping signal and applying it to an alternating current measuring bridge circuit network.

In Fig. 5, I have illustrated the use of a feed back circuit, generally similar to the feed back circuit shown in Fig. 1, to inject a damping signal into the output circuit of an alternating current measuring circuit M. When the latter is unbalanced by a change in a value being measured, the circuit is rebalanced by a reversible rebalancing motor H. As shown, the feed back circuit of Fig. 5 includes a parallel-T, RC network I having one end terminal connected through slider contact 70 to a potentiometer resistor 71. The latter has one terminal connected to ground and has its other terminal connected to the center tap conductor g' by a conductor 2, as does the resistor 15 connected to ground and to the conductor g' in Fig. 2. The second end terminal of the network I of Fig. 5 is connected to one terminal of the condenser element 72 of a phase shifter JA. The second terminal of the condenser 72 is connected to one terminal of a variable resistor 73 which has its second terminal connected to ground. A slider contact 74, engaging and adjustable along the resistance 73, is connected to ground through the primary winding 76 of a coupling transformer 75 through which the feed back signal is impressed on the output circuit of the bridge M. As shown, the secondary winding 77 of the coupling transformer 75 is connected in series with a coil 78 between the output terminals 81 and 82 of the bridge M. The coil 78 forms the primary winding of a coupling transformer 79 comprising a secondary winding 80 connected across the input terminals of an alternating current voltage and motor drive amplifying apparatus DG similar to the apparatus DG of Fig. 2.

The bridge M comprises ratio arms 83 and 84 including fixed resistances, a measuring arm 85 including a resistance ra; and a comparison or rebalancing arm 86 including a variable resistance which is adjusted as required to rebalance the bridge when unbalanced by changes in the resistance of the measuring arm 85. As shown, the rebalancing arm includes a fixed resistor r' and an adjustable resistance 87 connected in parallel to the resistance r'. As diagrammatically shown, the variable resistance 87 is a slide wire resistor engaged by a slider contact 88 which is connected by a short circuiting conductor 89 to one terminal of the resistance 87. The contact 88 is adjusted along the resistance 87 by the rotation of the rebalancing motor H through its operating connection H'. A resistance thermometer 90 or analogous element is connected across the terminals of the bridge arm 85. As shown, the output terminal conductor 81 connects the junction of the bridge arms 83 and 85 to one terminal of the transformer primary winding 78, and the second terminal of said winding is connected through the second output terminal 82 to the junction of the bridge arms 84 and 86. The bridge M is energized through a transformer 91 having one end terminal of its secondary winding 92 connected to the junction of the arms 83 and 84, and having its other end terminal connected to the junction of the bridge arms 85 and 86. The primary winding 93 of the transformer 91 is connected across the alternating current supply conductors L' and L². The latter also supply alternating current of suitable frequency and voltage, usually 60 cycles and 110–115 volts, to the power winding ha of the motor H, and to the amplifying apparatus DG.

In the operation of the apparatus shown in Fig. 5, the filter device I attenuates the 120 cycle component of the voltage transmitted from the amplifier DG to said filter device. The phase shifter JA compensates for the phase shifting action of the device I, as does the phase shifter J of Fig. 1. In consequence, the voltage impressed on the output circuit of the alternating current measuring bridge M through the coupling transformer 75 is either in phase, or is 180° out of phase, with the energizing voltage impressed on the bridge through the transformer 91, depending on the phase of bridge unbalance, but is always 180° out of phase with the bridge output signal. The coupling transformer 75 is so connected into the output circuit of the bridge M that the damping signal impressed through the transformer on the output circuit thus opposes and neutralizes a portion of the alternating current signal voltage between the terminal conductors 81 and 82 when the bridge M is unbalanced by a variation in the temperature of the resistance thermometer 90, and the resultant variation in the ratio of the potential drop across the resistor ra to the potential drop across the resistor r'.

Figure 6:
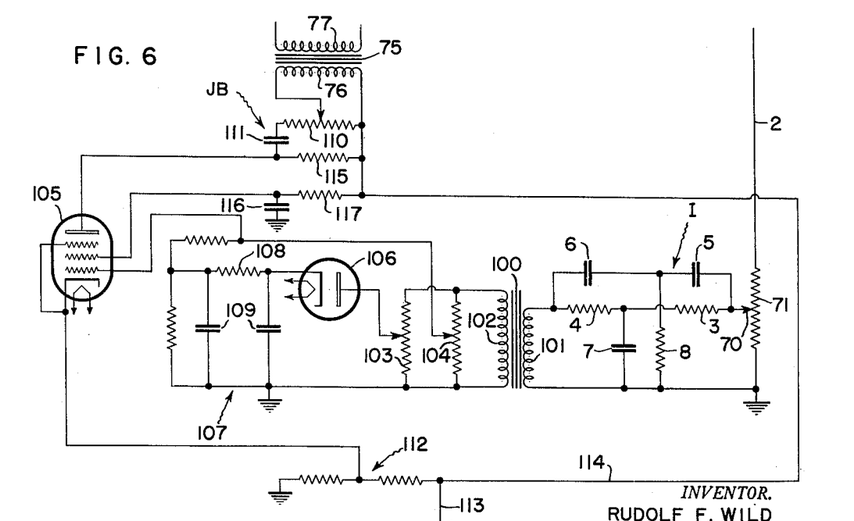

In Fig. 6, I have illustrated, by way of example, a modification of the apparatus shown in Fig. 5 including means for reducing the amount of negative feed back, or damping signal, when the measuring system unbalance is small, so as thereby to increase the sensitivity of the measuring system. In Fig. 6, a frequency filter device I is connected to the control winding of the rebalancing motor, just as in Fig. 5, for attenuation of the 120 cycle motor drive current transmitted to said device. The output terminal of the device I is connected to ground through the primary winding 101 of a coupling transformer 100. The secondary winding 102 of that transformer has its terminals connected by potentiometers 103 and 104. An adjustable portion of the voltage across the potentiometer 104 is applied to the control grid of an electron discharge pentode valve 105, which is of the variable mu, or super control type. In that type of valve, as is well known, the amplification varies considerably as the grid bias voltage is varied. To provide a variable grid bias for the valve 105, a diode rectifier 106 is employed to rectify an adjustable portion of the voltage across the potentiometer 103. A filter 107 is provided for filtering the rectified voltage before application to the control grid of the valve 105. The filter 107 comprises a resistor 108 and a separate condenser 109 connecting each terminal of said resistor to ground. The output circuit of the valve 105 includes a phase shifter JB comprising a resistor 110 and condenser 111. The device JB compensates for the phase shift suffered by the 60 cycle signal when passing through the frequency filter I of Fig. 6. An adjustable portion of the voltage across the resistor 110 may be applied to the output circuit of the bridge M through a coupling transformer 75, as in the arrangement of Fig. 5.

The valve 105 is negatively biased by applying to its cathode a positive bias voltage developed across a portion of a voltage divider 112. As shown, the latter has one terminal connected to ground and has its other terminal connected through a conductor 113 to a source of unidirectional voltage which is positive relative to ground, and connected through a conductor 114 and a resistor 115 to the anode of valve 105. The resistor 115 forms a shunt about the series connected resistor 110 and condenser 111. As shown, the screen grid of valve 105 is connected to ground through a condenser 116, and is connected to the conductor 114 by a resistor 117. Normally, therefore, the gain of valve 105 can be made quite low when the measuring circuit is in balance. No positive voltage can then be applied to the control grid of valve 105, as there is then no 60 cycle motor voltage which can be rectified by the diode 106. When the measuring circuit is unbalanced and the motor is in operation, the 60 cycle motor voltage component increases with the motor speed. In consequence, an increasingly positive bias is applied to the control grid valve 105, and its gain correspondingly increases, as the motor speed increases. Consequently, a much greater portion of the motor voltage is fed back when the motor speed is relatively high, than when it is relatively low. The apparatus shown in Fig. 6 thus has a greater sensitivity in the vicinity of apparatus balance than do devices in which the feed back voltage is directly proportional to the motor speed.

The subject matter of Fig. 6 is additionally shown and claimed in my copending divisional application entitled "Control Apparatus" which was filed on March 29, 1952, and bears Serial No. 279,375.

The apparatus illustrated in Fig. 6 may include a signal limiting feature analogous to that described in connection with Fig. 3, so that when balance is closely approached, the feed back voltage will be small when the departure from balance is small but will increase more rapidly than the motor control signal while the motor speed is increasing up to a predetermined value, and will remain constant for any motor speed exceeding said predetermined value. To this end an amplitude limiting device of any suitable design, such for example, as one used for amplitude limiting in frequency modulation broadcast receivers, may be inserted between the potentiometer resistor 110 and transformer 75 of Fig. 6 as shown at AL in Fig. 7. In such a case, the system still produces an A. C. feed back voltage.

Each of the feed back circuit arrangements shown in Figs. 5 and 6 may be readily modified, if desired, to produce a unidirectional voltage signal which may be used with a thermocouple circuit or with a D. C. energized resistance thermometer bulb circuit. Thus for example, a phase sensitive rectifier, which may be saturable as is the rectifier KA of Fig. 3, may be added to the feed back circuit shown in Fig. 6 by using the transformer primary winding 76 of Fig. 6, as the primary winding of the transformer 40 of Fig. 3 is used, to couple the rectifier to the portion of the Fig. 6 feed back circuit through which the winding 76 is connected to the feed back input conductor 2 of Fig. 6. Such an arrangement is illustrated in Fig. 8, wherein a D. C. bridge M' is associated with apparatus of the type shown in Figs. 3 and 5 or 6.

Although the invention disclosed herein is especially well adapted for use in apparatus of the character disclosed in said prior Wills Patent 2,423,540, the invention is also well adapted for use in any other motor control system including a reversible motor having an energizing winding connected to the output circuit of an electronic amplifier and in which an alternating current of variable phase and magnitude is produced in accordance with the variation in the phase and magnitude of a control signal amplified in the amplifier.

While, in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. In self-balancing measuring apparatus comprising a circuit network including an alternating current amplifying and motor controlling device having an input circuit and an output circuit, and including a normally balanced measuring circuit adapted to be unbalanced by a change in a measured condition and adapted, when so unbalanced, to provide an appropriate output signal, means connecting said measuring circuit to said input circuit and operative to impress on the latter an alternating current motor drive signal corresponding to said output signal, of a predetermined frequency, and of a phase depending upon the direction of measuring circuit unbalance, said output signal and hence said motor drive signal being operative to fade away as measuring circuit balance is closely approached and attained in a subsequent rebalancing operation, and a reversible rebalancing motor including a control winding connected to said output circuit and operative, under the control of said amplifying and motor controlling device, to effect rebalancing operations on said measuring circuit when the latter is unbalanced, said amplifying and motor controlling device including means operative to impress on said control winding, through said output circuit, an output current having a rebalancing component operative to cause said motor to effect said rebalancing operations and being of said predetermined frequency and of a phase and magnitude respectively dependent upon the phase and magnitude of said motor drive signal, said output current also having a component of a frequency which is higher than said predetermined frequency and which appears across said control winding as said motor drive signal fades away, the improved motor damping arrangement comprising a damping circuit connected in a feed back path between said control winding and a portion of said network, said damping circuit including an output portion connected to said network portion and an input portion connected across said control winding, whereby said rebalancing and said higher frequency current components, when present, are applied to said input portion from said control winding, and frequency selective means included in said damping circuit between said input and output portions and operative to permit said rebalancing current component to produce in said output portion a damping signal having a magnitude and sense which are respectively dependent upon the magnitude and phase of said rebalancing current component, said portion of said network being so chosen that the magnitude and sense of said damping signal are such as to cause said damping signal to reduce the effective magnitude of said motor drive signal, said frequency selective means being operative also to prevent said higher frequency current component from appearing in said damping signal, whereby the latter is made solely dependent upon said rebalancing current component and is rendered substantially entirely independent of said higher frequency current component, thereby to effect efficient damping of said motor without permitting said higher frequency current component to reduce the sensitivity of the apparatus at or near the balanced condition of said measuring circuit.

2. Apparatus as specified in claim 1, wherein said damping signal is an alternating current signal of said predetermined frequency and of substantially the same phase as said rebalancing current component.

3. Apparatus as specified in claim 2, wherein the frequency of said higher frequency current component is substantially twice said predetermined frequency, wherein said frequency selective means comprises a filter circuit tuned to provide minimum transmission at the frequency of said higher frequency current component and connected between said input and output portions, and wherein said damping circuit includes phase shifting means operative to effect the neutralization of any phase shift effected by said filter circuit on said rebalancing current component applied to said input portion.

4. Apparatus as specified in claim 2, wherein the output signal provided by said measuring circuit is a unidirectional signal having a magnitude and a polarity respectively dependent upon the extent and direction of measuring circuit unbalance, wherein said connecting means includes means operative to convert said unidirectional signal into said corresponding motor drive signal, and wherein said portion of said network constitutes a portion of said amplifying and motor controlling device in which said motor drive signal is of a phase which is displaced substantially 180 degrees from the phase of said damping signal, whereby the latter is operative to effect the neutralization of at least a portion of said motor drive signal.

5. Apparatus as specified in claim 2, wherein the output signal provided by said measuring circuit is an alternating current signal of said predetermined frequency and of a magnitude and phase respectively dependent upon the extent and direction of measuring circuit unbalance, and wherein said portion of said network constitutes a portion of said connecting means in which said output signal is of a phase which is displaced substantially 180 degrees from the phase of said damping signal, whereby the latter is operative to effect the neutralization of at least a portion of said output signal and hence said motor drive signal.

6. Apparatus as specified in claim 2, wherein said damping circuit includes amplitude limiting means connected between said input and output portions and operative to prevent the magnitude of said damping signal from exceeding a predetermined maximum value.

7. Apparatus as specified in claim 1, wherein said damping signal is a direct current signal of a magnitude and a polarity respectively dependent upon the magnitude and phase of said rebalancing current component, wherein the frequency of said higher frequency current component is substantially twice said predetermined frequency, and wherein said frequency selective means comprise a phase sensitive rectifying device connected between said input and output portions and adapted to be energized with alternating current of said predetermined frequency and of a phase which is substantially the same as that of said rebalancing current component, whereby said phase sensitive rectifying device is rendered substantially insensitive to said higher frequency current component.

8. Apparatus as specified in claim 7, wherein said phase sensitive rectifying device is operative to become saturated upon the application to said input portion of a magnitude of said rebalancing current component which is equal to or exceeds a predetermined maximum value, whereby the magnitude of said damping signal is prevented from exceeding a predetermined maximum value.

9. Apparatus as specified in claim 7, wherein said damping circuit includes a filter circuit tuned to provide minimum transmission at said predetermined frequency and connected between said phase sensitive rectifying device and said output portion, whereby ripple voltage components of said predetermined frequency are substantially completely prevented from appearing in said damping signal.

10. Apparatus as specified in claim 7, wherein said damping circuit includes a filter circuit tuned to provide minimum transmission at the frequency of said higher frequency current component and connected between said input portion and said phase sensitive rectifying device, said filter circuit being operative to prevent the application of at least a substantial portion of said higher frequency current component to said phase sensitive rectifying device, whereby said filter circuit cooperates with said phase sensitive rectifying device to render said damping signal independent of said higher frequency current component.

11. Apparatus as specified in claim 7, wherein said measuring circuit comprises a direct current potentiometric network including a pair of measuring terminals and a source of variable unidirectional voltage connected in series across said connecting means, said measuring terminals being adapted to have applied therebetween a unidirectional voltage to be measured, wherein said apparatus includes a mechanical connection between said motor and said source of variable voltage through which said motor effects said rebalancing operations, the output signal provided by said measuring circuit, when unbalanced, being a unidirectional signal having a magnitude and a polarity respectively dependent upon the extent and sense of the difference between the voltage to be measured and the voltage of said source of variable voltage, wherein said connecting means includes means operative to convert said output signal into said corresponding motor drive signal, and wherein said portion of said circuit network constitutes a portion of said measuring circuit at which said damping signal is applied in series with said measuring terminals and said source of variable voltage with a polarity opposite to that of said output signal.

12. Apparatus as specified in claim 7, wherein said measuring circuit comprises a direct current energized Wheatstone bridge circuit having in one arm an impedance to be measured, having in a second arm an adjustable bridge balancing impedance, and having an output portion connected across said connecting means, wherein said measuring circuit output signal appears when said bridge circuit is unbalanced, said output signal being a unidirectional signal having a magnitude and a polarity respectively dependent upon the extent and direction of bridge unbalance, wherein said apparatus includes a mechanical connection between said motor and said adjustable bridge balancing impedance through which said motor effects said rebalancing operations, wherein said connecting means includes means operative to convert said output signal into said corresponding motor drive signal, and wherein said portion of said circuit network constitutes a portion of said measuring circuit at which said damping signal is applied in series with said bridge circuit output portion and said connecting means with a polarity opposite to that of said output signal.

13. In motor controlling apparatus comprising an alternating current amplifying and motor controlling arrangement having an input circuit and an output circuit, means adapted to impress on said input circuit an alternating current motor drive signal derived from a device to be maintained in a balanced condition, said motor drive signal being of a predetermined frequency and of a phase depending upon the direction of unbalance of the device, said motor drive signal being operative to fade away as balance of the device is closely approached and attained in a subsequent rebalancing operation, and a reversible rebalancing motor including a control winding connected to said output circuit and operative, under the control of said amplifying and motor controlling arrangement, to effect rebalancing operations on the device when the latter is unbalanced, said arrangement including means operative to impress on said control winding, through said output circuit, an output current having a rebalancing component operative to cause said motor to effect said rebalancing operations and being of said predetermined frequency and of a phase and magnitude respectively dependent upon the phase and magnitude of said motor drive signal, said output current also having a component of a frequency which is higher than said predetermined frequency and which appears across said control winding as said motor drive signal fades away, the improved motor damping arrangement comprising a damping circuit connected in a feed back path between said control winding and a portion of said arrangement, said damping circuit including an output portion connected to said portion of said arrangement and an input portion connected across said control winding, whereby said rebalancing and said higher frequency current components, when present, are applied to said input portion from said control winding, and frequency selective means included in said damping circuit between said input and output portions and operative to permit said rebalancing current component to produce in said output portion an alternating current damping signal having a magnitude and phase which are respectively dependent upon the magnitude and phase of said rebalancing current component, said portion of said arrangement being so chosen that the phase of said damping signal is displaced substantially 180 degrees from the phase of said motor drive signal existing in said portion of said arrangement, whereby said damping signal is operative to reduce the effective magnitude of said motor drive signal, said frequency selective means being operative also to prevent said higher frequency current component from appearing in said damping signal, whereby the latter is made solely dependent upon said rebalancing current component and is rendered substantially entirely independent of said higher frequency current component, thereby to effect efficient damping of said motor without permitting said higher frequency current component to reduce the sensitivity of the apparatus at or near the balanced condition of the device.

RUDOLF F. WILD.

REFERENCES CITED

The following references are of record in the file of this patent:

UNITED STATES PATENTS

| Number | Name | Date |
|---|---|---|
| 2,191,997 | Side | Feb. 27, 1940 |
| 2,453,451 | Moseley | Nov. 9, 1948 |
| 2,472,167 | Matson et al. | June 7, 1949 |
| 2,477,729 | Fitz Gerald | Aug. 2, 1949 |
| 2,494,876 | Hornfeck | Jan. 17, 1950 |